United States Patent
Hirayama

(10) Patent No.: US 9,272,747 B2
(45) Date of Patent: Mar. 1, 2016

(54) BODY FRAME OF MOTORCYCLE AND METHOD FOR MANUFACTURING THE BODY FRAME

(71) Applicant: KAWASAKI JUKOGYO KABUSHIKI KAISHA, Hyogo (JP)

(72) Inventor: Seiji Hirayama, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/322,044

(22) Filed: Jul. 2, 2014

(65) Prior Publication Data

US 2015/0014958 A1 Jan. 15, 2015

(30) Foreign Application Priority Data

Jul. 3, 2013 (JP) ................. 2013-139698

(51) Int. Cl.
*B62K 11/02* (2006.01)
*B62K 19/32* (2006.01)
*B62K 11/04* (2006.01)

(52) U.S. Cl.
CPC ............... *B62K 19/32* (2013.01); *B62K 11/02* (2013.01); *B62K 11/04* (2013.01); *Y10T 29/49622* (2015.01)

(58) Field of Classification Search
CPC .................... B62K 11/02; B62K 11/04
USPC ................................. 280/281.1
See application file for complete search history.

(56) References Cited

U.S. PATENT DOCUMENTS

| 7,677,346 | B2* | 3/2010 | Suzuki | 180/219 |
| 2005/0247500 | A1* | 11/2005 | Miyamoto | 180/219 |
| 2006/0066068 | A1* | 3/2006 | Takahashi et al. | 280/124.109 |
| 2007/0018420 | A1* | 1/2007 | Hoshi | 280/274 |
| 2011/0186373 | A1* | 8/2011 | Mori et al. | 180/219 |
| 2012/0205890 | A1* | 8/2012 | Toda et al. | 280/281.1 |
| 2013/0026733 | A1* | 1/2013 | Oe et al. | 280/281.1 |

FOREIGN PATENT DOCUMENTS

JP 2009-234579 10/2009

* cited by examiner

*Primary Examiner* — Tony Winner
(74) *Attorney, Agent, or Firm* — Wenderoth, Lind & Ponack, L.L.P.

(57) ABSTRACT

A body frame has a head pipe supporting a steering shaft, a main frame extended rearward of a vehicle body from the head pipe, and a down frame extended downward of the vehicle body from the head pipe, wherein the down frame includes a front down frame member forming at least a front portion of the down frame, and a rear down frame member forming at least part of a rear portion of the down frame, which are joined. The rear down frame member integrally has an arm supporting the main frame and a gusset reinforcing a joined portion of the main frame to the head pipe.

10 Claims, 7 Drawing Sheets

BODY FRAME OF MOTORCYCLE AND METHOD FOR MANUFACTURING THE BODY FRAME

BACKGROUND OF THE INVENTION

1. Field of the Invention

The present invention relates to a body frame of a motorcycle having a reinforcing member which reinforces a connecting portion of a head pipe and other frame members.

2. Description of the Related Art

A body frame of a motorcycle mainly has a head pipe for pivotally supporting a steering shaft having an upper portion on which a steering wheel is mounted, a main frame extended rearward from the head pipe, and a down frame extended downward from the head pipe. Some body frames also have a lower frame extended substantially rearward from a lower end of the down frame, and a swing arm bracket connecting a rear end of the lower frame and a rear end of the main frame (for instance, see Japanese Patent Laid-open Publication No. 2009-234579).

The body frame in Japanese Patent Laid-open Publication No. 2009-234579 has, as separated members, a gusset reinforcing a joined portion of the main frame to the head pipe and a support bar supporting the main frame, which are joined by welding.

In this way, high stress based on a road surface input and an acceleration and deceleration input is likely to occur around the head pipe of the body frame. High strength is thus required around the head pipe. Further, stress is likely to concentrate onto a welded portion which joins these members. Consequently, more careful quality control is required for the welded portion around the head pipe, resulting in lowered productivity.

SUMMARY OF THE INVENTION

An object of the present invention is to obtain a body frame which can ensure strength and be improved in productivity.

To achieve the object, a body frame of a motorcycle according to a first aspect of the present invention includes: a head pipe supporting a steering shaft; a main frame extended rearward of a vehicle body from the head pipe; and a down frame extended downward of the vehicle body from the head pipe, wherein the down frame includes a front down frame member forming at least a front portion of the down frame, and a rear down frame member forming at least part of a rear portion of the down frame, which are joined, wherein the rear down frame member integrally has an arm supporting the main frame and a gusset reinforcing a joined portion of the main frame to the head pipe.

According to the first aspect, the following effects can be obtained.

(1) The rear down frame member integrally has the arm supporting the main frame and the gusset reinforcing the joined portion of the main frame to the head pipe. With this, as compared with when the arm and the gusset are separated from the rear down frame member, the number of components can be reduced.

(2) The arm and the gusset are integrally formed as one member. Therefore, it is unnecessary to join the arm, the gusset, and the rear down frame member and to control a joining quality of the joined portion. The body frame can thus be improved in productivity.

(3) The arm and the gusset are integrally formed as one member. Therefore, the number of welding beads for joining the arm, the gusset, and the rear down frame member can be reduced, and these members are not required to be overlapped for preventing meltdown in a welding bead. With this, the body frame can be reduced in weight.

(4) The body frame can be reduced in the number of components, be improved in productivity, and be reduced in weight. Therefore, the body frame can be reduced in cost.

In addition to the body frame, the first aspect of the present invention can have the following configurations.

(a) The head pipe includes a head pipe body member forming an upper portion of the head pipe, and the front down frame member forming a lower portion of the head pipe, which are joined, the head pipe body member has a first annular portion having a bearing supporting portion supporting an upper bearing pivotally supporting the steering shaft, the front down frame member has a second annular portion having a bearing supporting portion supporting a lower bearing pivotally supporting the steering shaft, and a recess opened rearward in a lower portion of the head pipe body member below the first annular portion and a recess opened forward in an upper portion of the rear down frame member are joined to configure an insertion hole extending a part of the steering shaft therethrough.

According to configuration (a), the head pipe body member has the first annular portion, the front down frame member has the second annular portion, and the head pipe body member, the front down frame member, and the rear down frame member are joined. Therefore, the steering shaft can be rotatably and pivotally supported in upper and lower portions of the head pipe.

The head pipe is configured by joining three members. As compared with when the head pipe is formed of a single member, the insertion hole which can insert the steering shaft thereinto can be easily formed. That is, the head pipe is divided into three members (an upper portion and an intermediate front portion in the up-down direction, a lower portion, and an intermediate rear portion in the up-down direction), so that the insertion hole of the steering shaft can be formed into a material shape of each member. Therefore, a processing allowance for forming the insertion hole by machining after joining of the members can be reduced. With this, a processing ability and yield can be improved to reduce a processing cost.

(b) In addition to configuration (a), the main frame includes a pair of left and right main frame members, the head pipe body member has an extended portion extended rearward between the pair of left and right main frame members, the gusset has an extended portion joined portion and a pair of left and right main frame joined portions, the extended portion is joined to the extended portion joined portion, and the pair of left and right main frame members are joined to the pair of left and right main frame joined portions, respectively.

According to configuration (b), the extended portion joined portion of the gusset is joined to the extended portion extended rearward of the head pipe body member. The gusset can thus be strongly joined to the head pipe body member. In addition, the pair of left and right main frame members are joined to the main frame joined portions of the gusset. The main frame members can thus be strongly joined to the gusset. That is, joining of the main frame members to the head pipe can be reinforced by the gusset. Strength of joining of the main frame members to the head pipe can thus be improved.

(c) The front down frame member is a forged molded article, and the rear down frame member is a cast molded article.

According to configuration (c), the down frame is divided into the front down frame member and the rear down frame member, the front down frame member on an outer peripheral side of the body frame to which high stress is applied is formed by forging with high strength, and the rear down frame member on an inner peripheral side of the body frame integrally having the arm and the gusset is formed by casting with a high degree of freedom in shape. That is, the down frame is divided into an outside portion of the body frame which requires high strength and an inside portion of the body frame which requires a degree of freedom in shape. The body frame can ensure strength thereof and be increased in the degree of freedom in shape.

(d) In addition to configuration (c), the front down frame member and the rear down frame member integrally have mounting portions for fixing components connected to the body frame.

According to configuration (d), the front down frame member and the rear down frame member integrally have mounting portions for fixing components connected to the body frame. With this, as compared with when the mounting portions are formed as separated members which are then joined to the front down frame member and the rear down frame member by welding, the number of welded portions can be reduced. That is, the body frame can be improved in productivity.

(e) In addition to configuration (c) or configuration (d), a lower end of the rear down frame member is supported from below by a lower portion of the front down frame member, and an engine supporting portion supporting an engine is integrally formed in the lower portion of the front down frame member.

According to configuration (e), the engine supporting portion is integrally formed in the lower portion of the front down frame member which is formed by forging and has a high degree of freedom in shape. Therefore, the degree of freedom in a forming position of the engine supporting portion can be improved. For instance, the front down frame member and the engine supporting portion are formed to enlarge a space on an inward side of the body frame. Engine mountability on the body frame can thus be improved.

A second aspect of the present invention directs to a body frame of a motorcycle includes: a head pipe supporting a steering shaft; a main frame extended rearward of a vehicle body from the head pipe; and a down frame extended downward of the vehicle body from the head pipe, wherein the down frame includes a front down frame member forming at least a front portion of the down frame, and a rear down frame member forming at least part of a rear portion of the down frame, which are joined, wherein the rear down frame member integrally has a gusset reinforcing a joined portion of the main frame to the head pipe.

According to the second aspect, the rear down frame member integrally has the gusset reinforcing the joined portion of the main frame to the head pipe. With this, as compared with when the gusset are separated from the rear down frame member, the number of components can be reduced, and also the number of welding portions can be reduced. The body frame thus can be improved in productivity. Furthermore, as well as the first aspect of the present inventions, with reducing the number of welding portions, the body frame can be reduced in weight.

In addition to the body frame, the second aspect of the present invention can have the following configurations.

(f) The body frame includes an arm member which is connected to the rear down frame member at an one of ends of the arm member, and which is connected to the main frame at the other of the ends, wherein the arm member supports the main frame.

According to configuration (f), as compared with when the rear down frame member integrally has an arm member, the rear down frame member is simplified. The rear down frame member thus can be improved in productivity. That is, the rear down frame member can be improved in productivity, while the supporting rigidity of the main frame member can be improved by the arm member.

(g) In addition to configuration (f), the arm member is a hollow forged molded article or an extruded pipe.

According to configuration (g), the body frame can be reduced in weight and also improved in strength. With this, the body frame has higher rigidity.

A third aspect of the present invention directs to a method for manufacturing a body frame of a motorcycle which has a head pipe supporting a steering shaft, a main frame extended rearward of a vehicle body from the head pipe, and a down frame extended downward of the vehicle body from the head pipe, and in which the head pipe includes a head pipe body member forming an upper portion of the head pipe, and a front down frame member forming a lower portion of the head pipe, which are joined, the down frame includes the front down frame member forming at least a front portion of the down frame, and a rear down frame member forming at least part of a rear portion of the down frame, which are joined, the rear down frame member integrally has an arm supporting the main frame and a gusset reinforcing a joined portion of the main frame to the head pipe. The method includes preparing the head pipe body member as a forged mold article; preparing the front down frame member as a forged mold article; preparing the rear down frame member as a cast mold article; joining the head pipe body member, the front down frame member, and the rear down frame member by welding; and joining the main frame to the head pipe body member, the gusset, and the arm by welding.

According to the third aspect, the body frame of a motorcycle can ensure strength and be improved in productivity.

DETAILED DESCRIPTION OF THE INVENTION

An embodiment of the present invention will be described with reference to FIGS. 1 to 8. For convenience in the description, a traveling direction of a vehicle is the "front" of the vehicle and the components, and a left-right direction seen from a rider on the vehicle is the "left-right direction" of the vehicle and the components.

[An Overall Configuration of the Vehicle]

Figure 1:
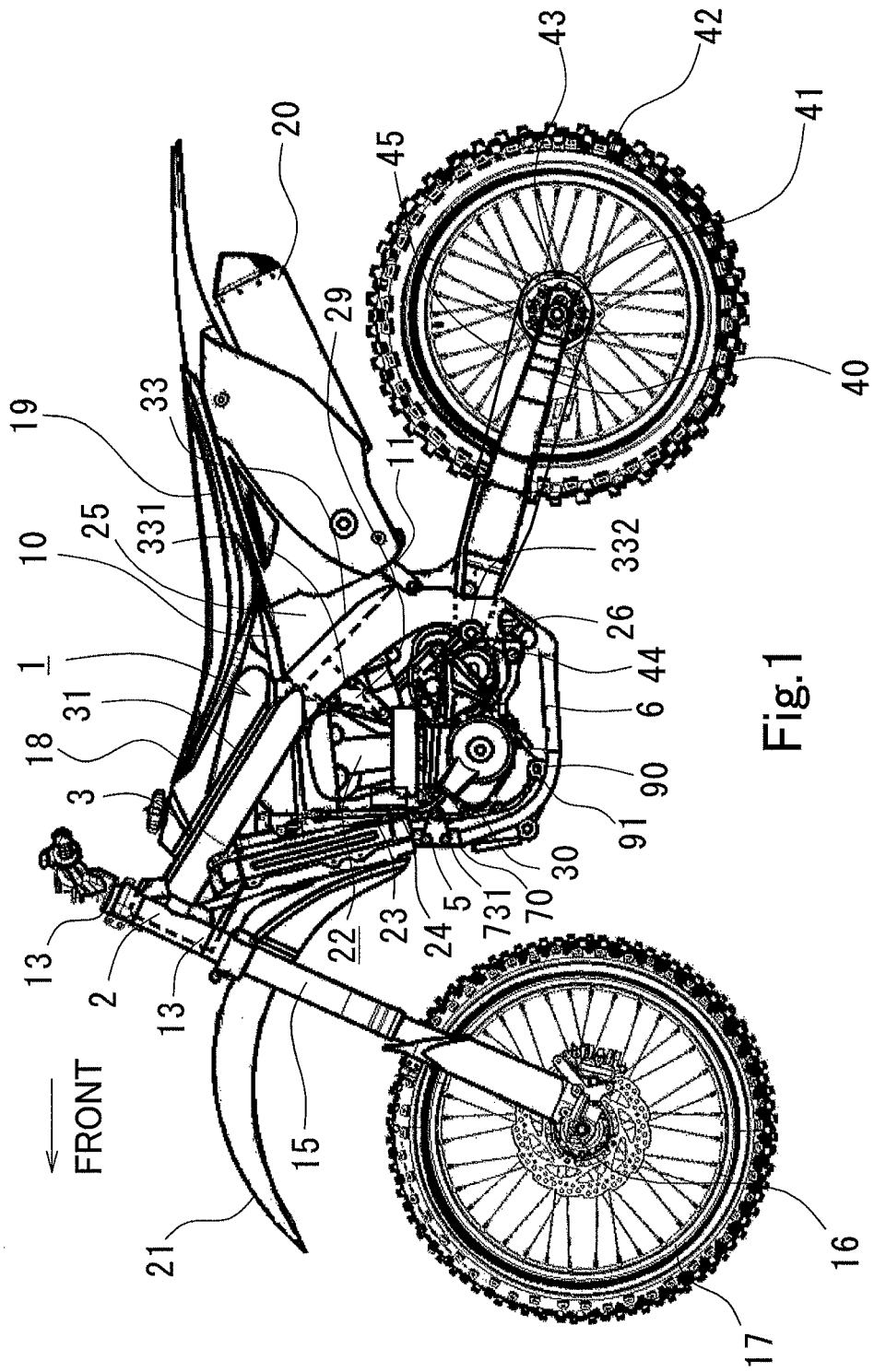
FIG. 1 is a left side view of a motorcycle having a body frame according to the present invention.

FIG. 1 is a left side view of a motorcycle of the motocrosser type. As shown in FIG. 1, the motorcycle has a body frame 1. The body frame 1 has a head pipe 2, a main frame 3 extended substantially rearward and downward from the head pipe 2, a down frame 5 extended substantially downward from the head pipe 2, and a lower frame 6 connecting a lower portion of the down frame 5 and a lower portion of the main frame 3. The down frame 5 is extended downward of the main frame 3 from the head pipe 2, in other words, is extended more downward of the main frame 3 as it goes rearward from the head pipe 2.

Figure 2:
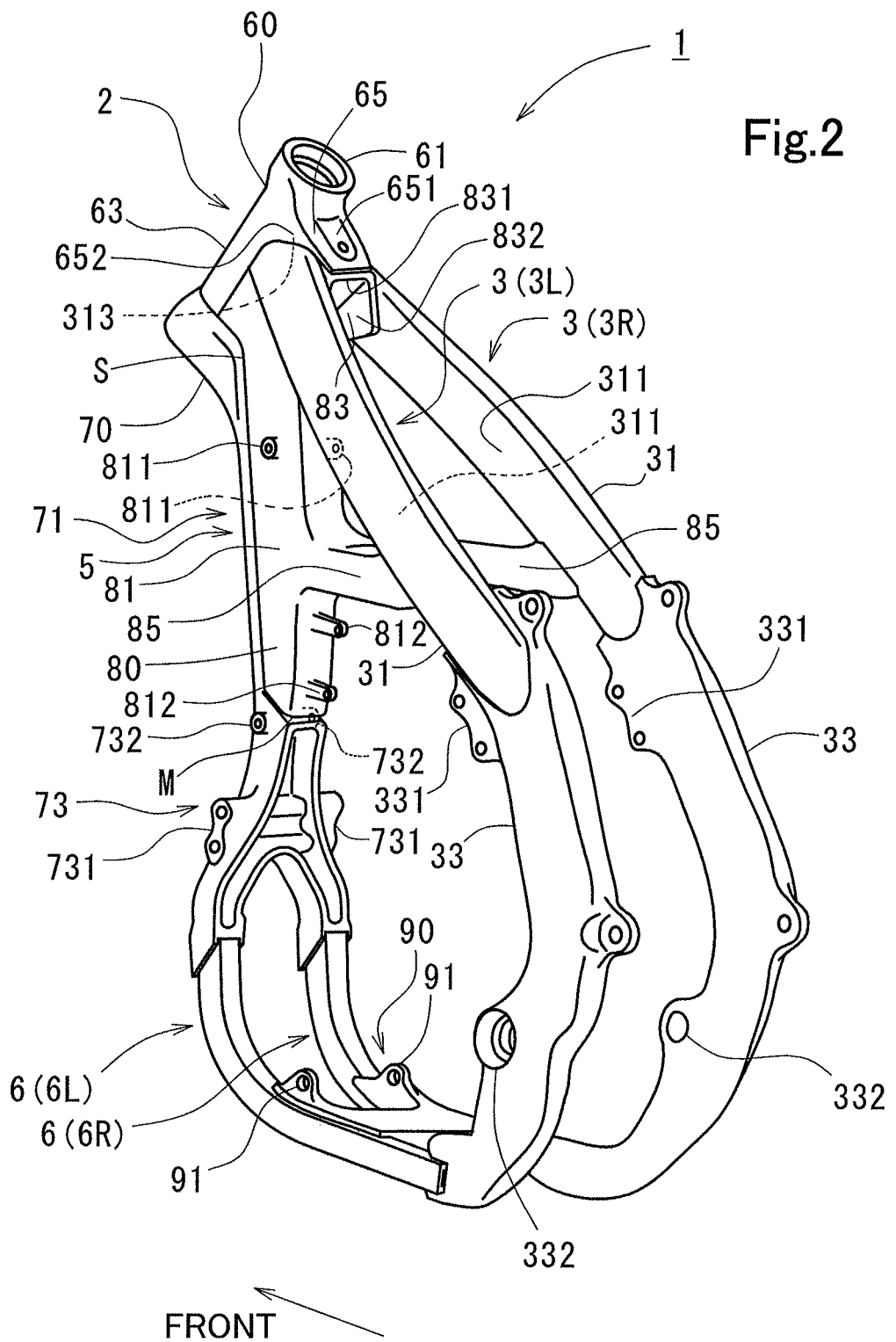
FIG. 2 is a perspective view of the body frame.

FIG. 2 is a perspective view of the body frame 1 of FIG. 1. As shown in FIG. 2, the main frame 3 has a pair of left and right main frames 3L and 3R, which each have a main frame member 31 and a swing arm bracket 33. The lower frame 6 has a pair of left and right lower frames 6L and 6R, and a connecting bracket 90 connecting the lower frames 6L and 6R.

As shown in FIG. 1, a seat rail 10 is connected to a front portion of the swing arm bracket 33 and is extended substantially rearward. In addition, a rear frame 11 is connected to a substantially intermediate portion in the up-down direction of the swing arm bracket 33, is extended rearward and upward, and has a rear end connected to a rear end of the seat rail 10.

A pair of left and right front forks 15 are supported at the head pipe 2 via a steering shaft (not shown) and upper and lower brackets 13. A front wheel 17 is rotatably supported at lower ends of the front forks 15 via a front axle shaft 16.

A fuel tank 18 and a seat 19 are provided above the pair of left and right main frame members 31 and 31 and the seat rail 10. An exhaust muffler 20 is provided below the rear frame 11. A front fender 21 is provided on the front forks 15.

An engine 22 is mounted on the body frame 1, and as shown in FIG. 2, is supported in the body frame 1 by a pair of left and right lower mounting portions 91 and 91 provided in the connecting bracket 90 of the lower frame 6, a pair of left and right upper mounting portions 331 and 331 provided in the pair of left and right swing arm brackets 33 and 33, pivot shaft portions 332 and 332 of the pair of left and right swing arm brackets 33 and 33, and a pair of left and right front mounting portions 731 and 731 provided in the lower portion of the down frame 5. By referring to FIG. 1, a radiator 23 and an ignition coil 24 are mounted on the down frame 5, and an air cleaner box 25 for air intake is arranged rearward and upward from between the pair of left and right main frames 3L and 3R.

A swing arm 40 for supporting a rear wheel is rotatably supported by the pivot shaft portions 332 and 332 of the pair of left and right swing arm brackets 33 and 33, and is extended rearward. A rear wheel 42 is rotatably supported at a rear end of the swing arm 40 via a rear axle shaft 41. A drive chain 45 is entrained between a driven sprocket 43 provided on the rear wheel 42 and an output sprocket 44 arranged on a left side surface of a crankcase 26 of the engine 22. The rear wheel 42 is driven via the drive chain 45. The swing arm 40 is resiliently supported in the body frame 1 by a rear suspension device (not shown).

(A Configuration of the Head Pipe 2)

Figure 3:
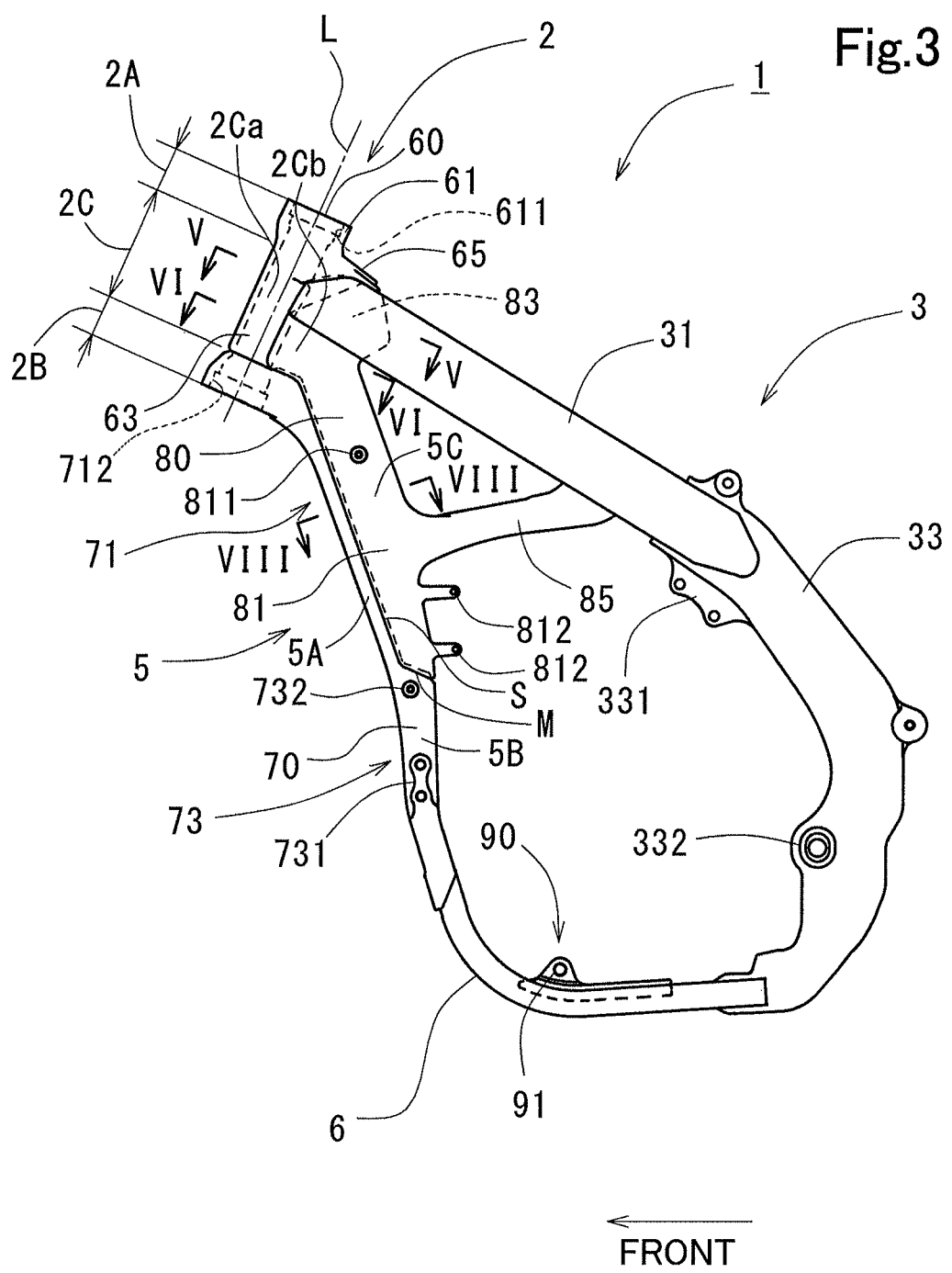
FIG. 3 is a left side view of the body frame.

FIG. 3 is a left side view of the body frame 1. As shown in FIG. 3, the head pipe 2 has a first annular portion 611 and a second annular portion 712 which can support at least bearings (not shown) spaced in the up-down direction, and rotatably supports the steering shaft (not shown) via the bearings. The head pipe 2 includes an upper portion 2A supporting the upper bearing (not shown), a lower portion 2B supporting the lower bearing (not shown), and an intermediate portion 2C between the upper portion 2A and the lower portion 2B. The intermediate portion 2C is hollow to insert the steering shaft therethrough.

The upper portion 2A and the lower portion 2B of the head pipe 2 are annular to fit the bearings. The intermediate portion 2C of the head pipe 2 includes an intermediate front portion 2Ca located forward of axis L of the steering shaft, and an intermediate rear portion 2Cb located rearward of axis L of the steering shaft.

Figure 5:
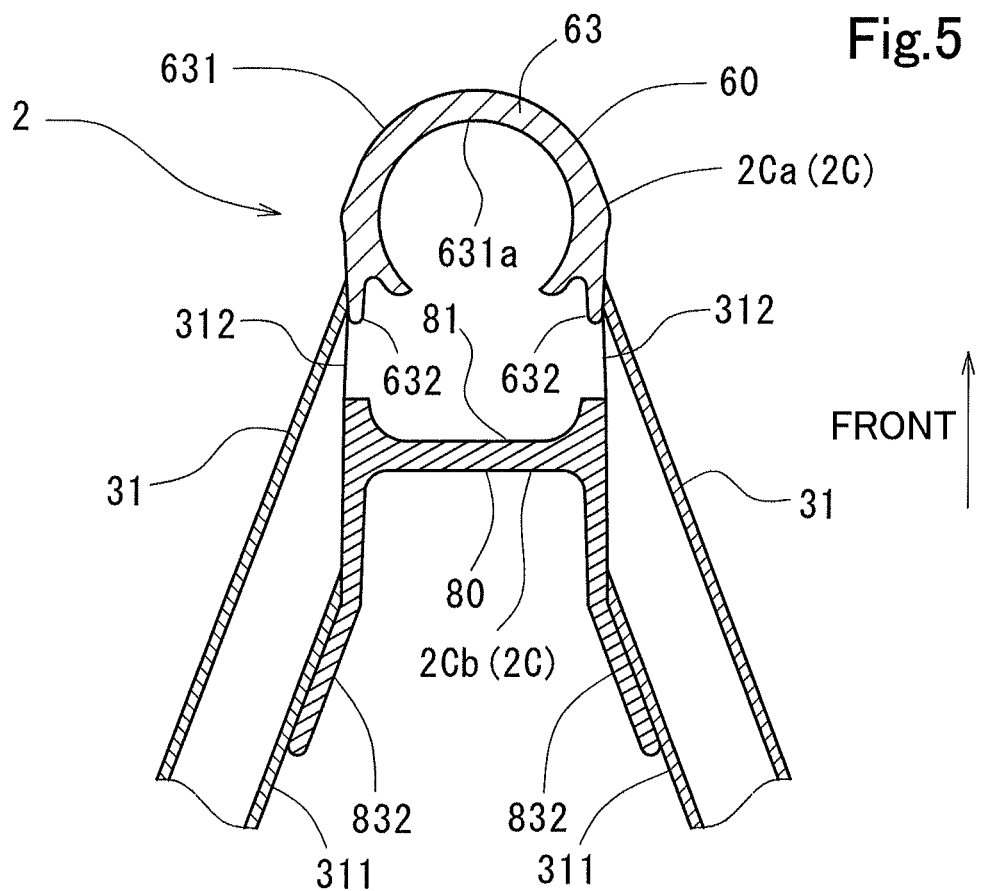
FIG. 5 is an enlarged sectional view taken along a line V-V of FIG. 3.
Figure 6:
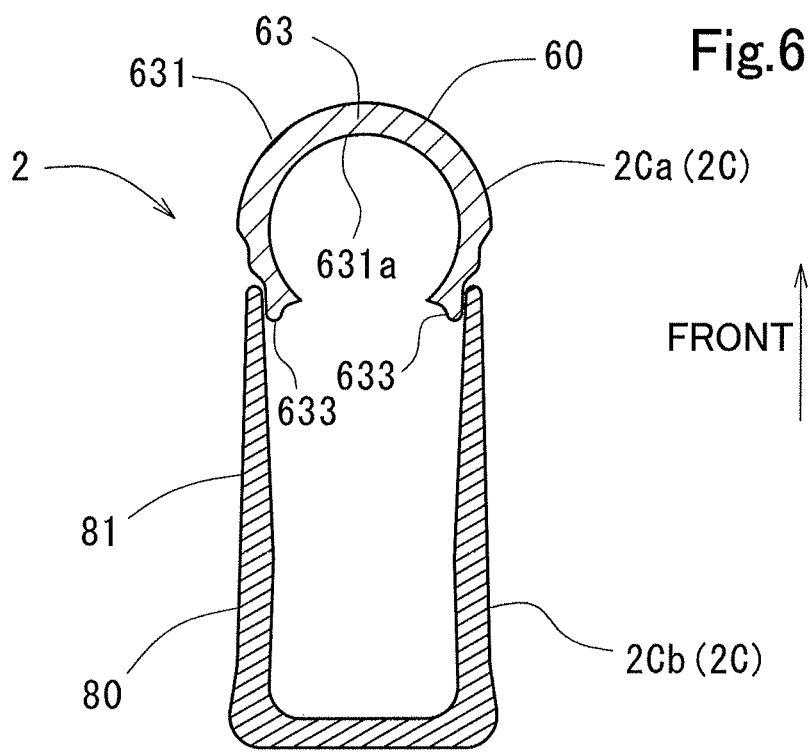
FIG. 6 is an enlarged sectional view taken along a line VI-VI of FIG. 3.

FIG. 5 is a cross-sectional view taken along a line V-V of FIG. 3. FIG. 6 is a cross-sectional view taken along a line VI-VI of FIG. 3. As shown in FIGS. 5 and 6, the intermediate front portion 2Ca has a recess having an opening opened rearward, and the intermediate rear portion 2Cb has a recess having an opening opened forward. The intermediate portion 2C of the head pipe 2 is tubular to extend the steering shaft therethrough by butting the intermediate front portion 2Ca and the intermediate rear portion 2Cb.

As shown in FIG. 3, the head pipe 2 has a head pipe body member 60 configuring the upper portion 2A and the intermediate front portion 2Ca, a front down frame member 70 configuring the lower portion 2B, and a rear down frame member 80 forming the intermediate rear portion 2Cb. These members 60, 70, and 80 are joined by welding.

(A Configuration of the Down Frame 5)

A division line S is set to the down frame 5. The division line S is extended in an extending direction of the down frame 5, passes through an intermediate portion in the front-rear direction of the down frame 5, and is folded rearward in an intermediate portion in the up-down direction of the down frame 5. The down frame 5 includes a front portion 5A located forward of division the line S, a lower portion 5B located downward of the division line S, and a rear upper portion 5C located rearward and upward of the division line S. A portion of the division line S extended in the extending direction of the down frame 5 passes through a forward portion of the down frame 5 from the intermediate portion in the front-rear direction thereof.

Figure 8:
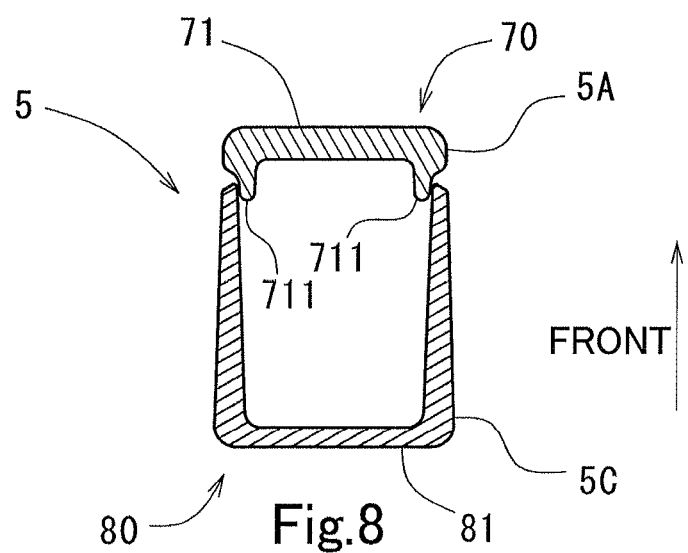
FIG. 8 is an enlarged sectional view taken along a line VIII-VIII of FIG. 3.

FIG. 8 is a cross-sectional view taken along a line VIII-VIII of FIG. 3. As shown in FIG. 8, the down frame 5 has an outer plane having a rectangular cross section perpendicular to the extending direction and extended along a front surface, left and right side surfaces, and a rear surface of the vehicle body. A dimension in the front-rear direction of the rear upper portion 5C of the down frame 5 is larger than a dimension in the front-rear direction of the front portion 5A of the down frame 5.

As shown in FIG. 3, the down frame 5 has the front down frame member 70 configuring the front portion 5A and the lower portion 5B, and the rear down frame member 80 configuring the rear upper portion 5C. The members 70 and 80 are joined by welding.

That is, as shown in FIG. 2, the body frame 1 has the head pipe body member 60, the front down frame member 70, the rear down frame member 80, the pair of left and right main frame members 31 and 31, the pair of left and right swing arm brackets 33 and 33, the pair of left and right lower frames 6L and 6R, and the connecting bracket 90, which are joined by welding. Configurations of the each member will be specifically described below with reference to FIGS. 2 to 8.

(The Head Pipe Body Member 60)

Figure 4:
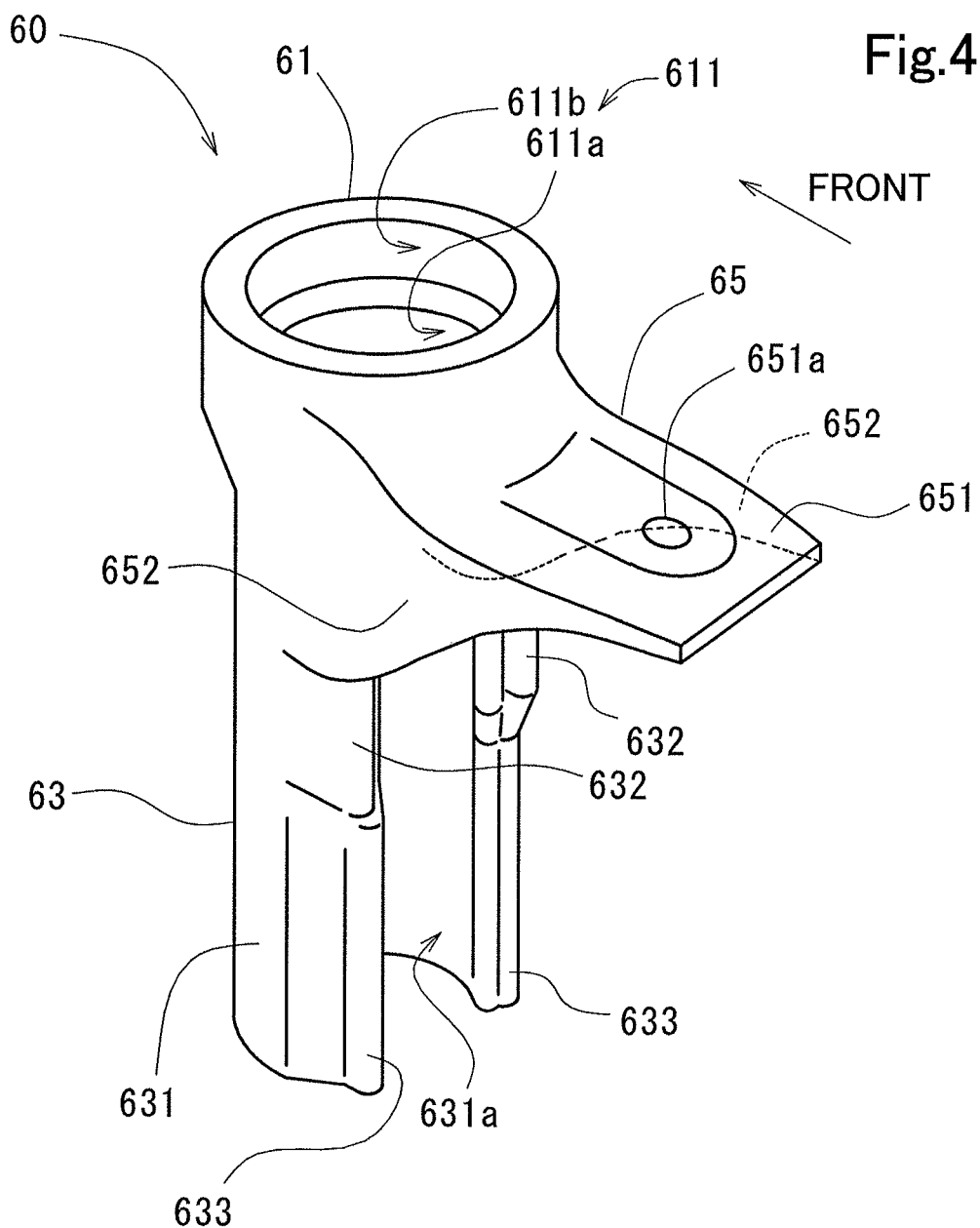
FIG. 4 is a perspective view of a head pipe body member.

FIG. 4 is a perspective view of the head pipe body member 60. As shown in FIG. 4, the head pipe body member 60 is a forged molded article made of an aluminum alloy, and integrally has a tubular portion 61, a partially tubular portion 63 which has a tubular cross section and is extended downward from the tubular portion 61, and an extended portion 65 extended rearward from the tubular portion 61. The first annular portion 611 is formed on an inner circumferential surface of the tubular portion 61. The first annular portion 611 includes a steering shaft insertion hole 611a which inserts the steering shaft therethrough, and a first bearing supporting portion 611*b* which supports the bearing (not shown) pivotally supporting the steering shaft.

As shown in FIGS. 5 and 6, the partially tubular portion 63 has an arcuate portion 631, a pair of left and right first projected portions 632 and 632 (see FIG. 5) which are projected rearward from a rear portion of the arcuate portion 631, and a pair of left and right second projected portions 633 and 633 (see FIG. 6). The first projected portion 632 is provided along the steering shaft corresponding to a joined portion to a front portion of the main frame member 31. The second projected portion 633 is provided along the steering shaft corresponding to a joined portion to an upper portion of the rear down frame member 80. As shown in FIG. 4, an inner circumferential surface 631*a* of the arcuate portion 631 has substantially the same size as the steering shaft insertion hole 611*a* of the tubular portion 61.

As shown in FIG. 2, the extended portion 65 has an upper wall 651 which is extended in the left-right direction between the pair of left and right main frames 3L and 3R, the upper wall 651 having a rear end connected to an upper rear end of a gusset 83 of the rear down frame member 80. As shown in FIG. 4, the extended portion 65 further has left and right side walls 652 and 652 which connect left and right ends of the upper wall 651, the tubular portion 61, and the partially tubular portion 63 and are abutted on an outward side in the vehicle width direction of an upper portion of the main frame member 31 (see FIG. 2). A fuel tank fixing hole 651*a* is extended through the upper wall 651 in the substantially up-down direction, and fixes the fuel tank 18 (see FIG. 1).

(The Front Down Frame Member 70)

As shown in FIG. 3, the front down frame member 70 is a forged molded article made of an aluminum alloy, integrally has the lower portion 2B of the head pipe 2 and the front portion 5A and the lower portion 5B of the down frame 5, and is joined to a lower portion of the head pipe body member 60 by welding. The front down frame member 70 has a front down frame upper portion 71 which is joined to the lower portion of the head pipe body member 60 and the rear down frame member 80, and a front down frame lower portion 73 which supports a lower portion of the rear down frame member 80 from below and includes a two-forked portion at a lower end thereof joined to the pair of left and right lower frames 6L and 6R therebelow.

Figure 7:
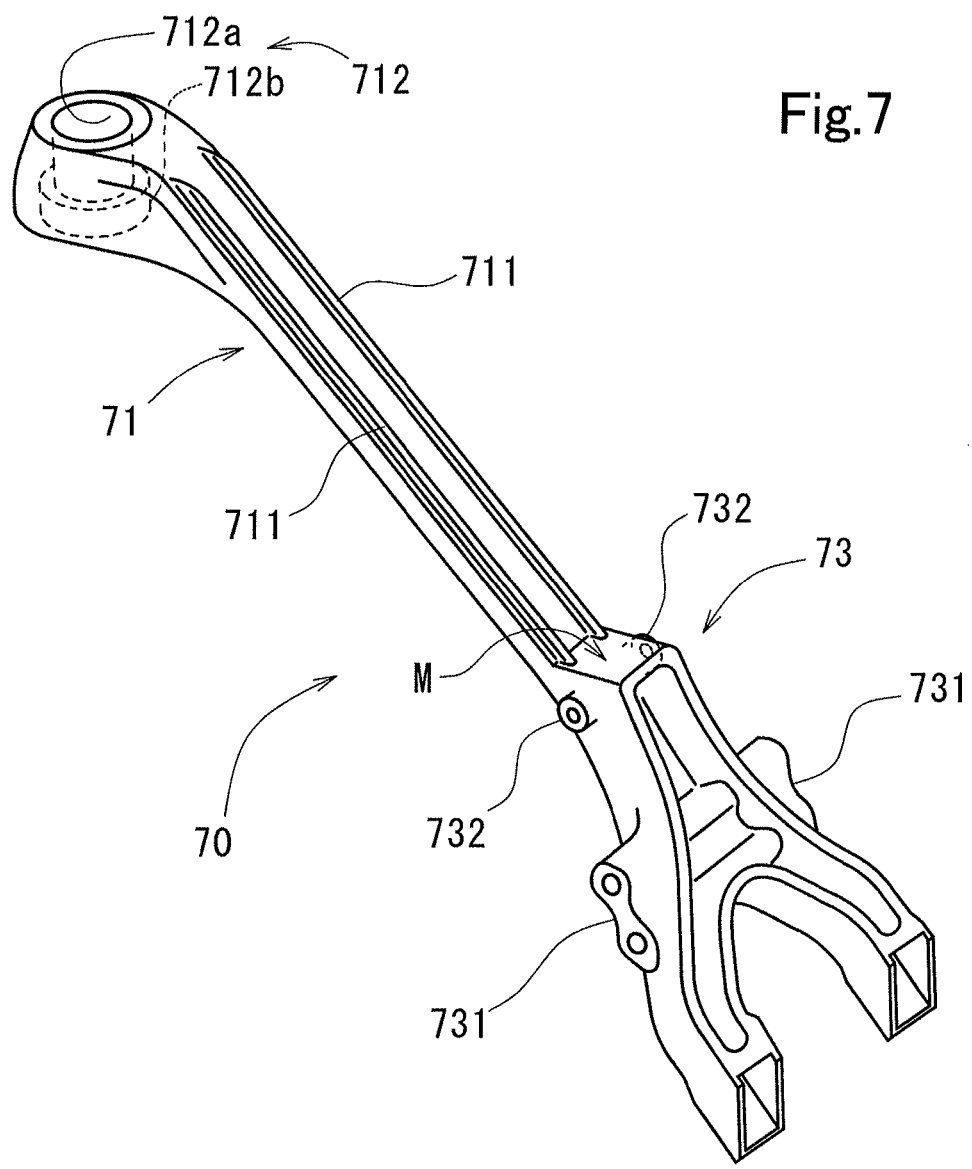
FIG. 7 is a perspective view of a front down frame member.

FIG. 7 is a perspective view of the front down frame member 70. As shown in FIG. 7, the second annular portion 712 is formed in an upper portion of the front down frame upper portion 71, and communicates with the inner circumferential surface 631*a* (see FIG. 4) of the head pipe body member 60. The second annular portion 712 includes a steering shaft insertion hole 712*a* inserting the steering shaft therethrough, and a second bearing supporting portion 712*b* which supports the bearing (not shown) pivotally supporting the steering shaft.

The front down frame member 70 has supporting surface M which supports the rear down frame member 80 from below. Supporting surface M has a substantially rectangular shape along the front and rear surfaces and left and right side surfaces of the vehicle body. With this, the front down frame member 70 and the rear down frame member 80 can be easily welded.

As shown in FIG. 8, a pair of left and right third projected portions 711 and 711 are provided in a rear portion of the front down frame upper portion 71 corresponding to the joined portion to the rear down frame member 80 (see FIG. 3), and are projected rearward.

As shown in FIG. 7, the front down frame lower portion 73 has a substantially U-shaped cross section opened rearward, and integrally has, on side surfaces thereof, the pair of left and right front mounting portions 731 and 731 and the pair of left and right radiator mounting portions 732 and 732 for supporting the engine 22 (see FIG. 1) and the radiator 23 (see FIG. 1) in the body frame 1 (see FIG. 1). The front down frame member 70 which is two-forked below supporting surface M can strongly support the rear down frame member 80. Likewise, the front mounting portion 731 which is formed below the supporting surface can strongly support the rear down frame member 80. As shown in FIG. 3, the front down frame lower portion 73 is curved forward to enlarge a space on an inward side of the body frame 1.

The front down frame member 70 has higher rigidity than the rear down frame member 80. For instance, the front down frame member 70 has a material or shape (e.g., wall thickness) different from the rear down frame member 80 to have high rigidity. In this example, the front down frame member 70 which uses a forged component has higher rigidity than the rear down frame member 80 which uses a cast component, as described later.

(The Rear Down Frame Member 80)

As shown in FIGS. 2 and 3, the rear down frame member 80 is a cast molded article made of an aluminum alloy, integrally has the intermediate rear portion 2Cb of the head pipe 2 and the rear upper portion 5C of the down frame 5, and has a main body 81, the gusset 83, and a pair of left and right arms 85 and 85. The main body 81 is extended along the rear portion of the front down frame upper portion 71 from a lower portion of the upper wall 651 (see FIG. 2) of the extended portion 65 of the head pipe body member 60 to supporting surface M of the front down frame member 70.

As shown in FIG. 2, the gusset 83 has a first joined portion 831 abutted and joined to the lower portion of the upper wall 651 of the head pipe body member 60, and a pair of left and right second joined portions 832 and 832 (see FIG. 5) extended rearward and downward of the first joined portion 831. As shown in FIG. 5, the second joined portions 832 and 832 are spaced in the left-right direction and extended substantially rearward along opposite surfaces of the pair of left and right main frame members 31 and 31, and are joined to the main frame members 31 and 31.

As shown in FIGS. 2 and 3, the pair of left and right arms 85 and 85 are extended substantially rearward from slightly lower positions from a center in the up-down direction of the main body 81. The pair of left and right arms 85 and 85 are extended rearward to be spaced in the left-right direction from the main body 81, and are curved rearward. That is, the pair of left and right arms 85 and 85 have a substantially U-shape opened rearward as a whole. The arm 85 which has a rectangular cross section has higher rigidity. The arm 85 which is hollow can prevent lowered rigidity and enables weight reduction.

As shown in FIGS. 5, 6, and 8, the main body 81 has a substantially U-shaped cross section opened forward as a whole. An inner width in the left-right direction of the substantially U-shaped cross section of the main body 81 has a dimension which substantially coincides with an outer width of the pair of left and right second projected portions 633 and 633 in joined portions to the head pipe body member 60 (see FIG. 6), and has a dimension which substantially coincides with an outer width of the pair of left and right third projected portions 711 and 711 in joined portions to the front down frame member 70 (see FIG. 8). As shown in FIGS. 6 and 8, a front end of the substantially U-shaped cross section of the main body 81 is overlapped with the corresponding projected portions 633 and 711.

As shown in FIGS. 5 and 6, the rear down frame member 80 and the pair of left and right main frame members 31 and 31 are joined to a rear portion of the head pipe body member 60. Therefore, a space which can insert the steering shaft thereinto is formed in the head pipe 2 to be separated from outside. Any water drops, mud, and dirt can thus be prevented from entering into the space. As shown in FIG. 8, the rear down frame member 80 and the front down frame member 70 are joined to each other. Therefore, the down frame 5 is hollow to enable weight reduction. In the joined portions configured of the substantially U-shaped cross section and the projected portions 633 and 711, the members are overlapped. Therefore, a welding bead can be prevented from being melted down to the hollow portion at the time of welding each joined portion. With this, the welded portion can be improved in welding quality.

As shown in FIG. 2, the main body 81 has, on side surfaces thereof, a pair of left and right radiator mounting portions 811 and 811, and has, in a rear portion thereof, ignition coil mounting portion 812. The ignition coil mounting portion 812 is preferably projected from the main body 81 in the same direction as the extending direction of the arm 85. With this, the die cutting direction of the arm 85 and the ignition coil mounting portion 812 can be aligned. A larger die and a complicated molding process can thus be prevented. Other accessories in addition to the ignition coil 24 may be fixed to the rear down frame member 80.

(The Main Frame Member 31)

As shown in FIG. 2, the pair of left and right main frame members 31 and 31 are extruded pipes made of an aluminum alloy and having a substantially D-shaped cross section having planar portions 311 and 311, are extended and curved rearward from the head pipe 2 to be spaced from each other, and are extended rearward to be substantially parallel to each other. Lower portions of the pair of left and right main frame members 31 and 31 are joined to rear portions of the pair of left and right arms 85 and 85 by welding in a rear position from a center position in the front-rear direction.

As shown in FIG. 5, in the main frame member 31, a front end 312 inclined to an axis is joined to a side surface of the first projected portion 632 of the head pipe body member 60 and a side surface of the rear down frame member 80, and the planar portion 311 is joined to the second projected portion 832 of the rear down frame member 80 to be extended rearward. In addition, as shown in FIG. 2, upper portions 313 and 313 on an outward side of the body frame 1 at front ends of the pair of left and right main frame members 31 and 31 are joined to the pair of left and right side walls 652 and 652 of the head pipe body member 60.

(The Lower Frame 6 and the Bracket 90)

As shown in FIG. 2, the pair of left and right lower frames 6L and 6R are extruded pipes made of an aluminum alloy and having a rectangular cross section, and are connected to each other by the bracket 90 joined to rear portions thereof by welding. The bracket 90 is an aluminum forged molded article, and integrally has the pair of left and right lower mounting portions 91 and 91 for supporting the engine 22 (see FIG. 1).

(The Swing Arm Bracket 33)

As shown in FIG. 2, the pair of left and right swing arm brackets 33 and 33 are joined to rear portions of the pair of left and right main frame members 31 and 31, are extended substantially rearward and downward to be curved downward, and are joined to the rear portions of the pair of left and right lower frames 6L and 6R. The swing arm bracket 33 is a forged molded article made of an aluminum alloy, and integrally has the upper mounting portion 331 for supporting the engine 22 (see FIG. 1) and the pivot shaft portion 332 pivotally supporting a front portion of the swing arm 40 (see FIG. 1).

(Assembling of the Engine 22 to the Body Frame 1)

As shown in FIG. 1, the engine 22 is supported in the body frame 1 to have an upper portion connected to the upper mounting portions 331 and 331 of the pair of left and right swing arm brackets 33 and 33 via a pair of left and right upper portion mounting brackets 29 and 29, a front portion connected to the pair of left and right front mounting portions 731 and 731 of the front down frame member 70 via a pair of left and right front portion mounting brackets 30 and 30, a lower portion directly connected to the pair of left and right lower mounting portions 91 and 91 of the connecting bracket 90, and a rear portion co-fastened to the swing arm 40 connected to the pivot shaft portions 332 and 332 of the pair of left and right swing arm brackets 33 and 33.

That is, the upper, lower, front, and rear portions of the engine 22 are connected to the body frame 1 from the left and right sides. Therefore, the engine 22 can be strongly mounted on the body frame 1. The body frame 1 can be increased in rigidity in the left-right direction via the engine 22.

(Assembling of Other Components to the Body Frame 1)

As shown in FIG. 1, the radiator 23 is mounted on the body frame 1 by the radiator mounting portion 811 (see FIG. 2) provided in the rear down frame member 80 (see FIG. 2) and the radiator mounting portion 732 (see FIG. 2) provided in the front down frame member 70. The ignition coil 24 is mounted on the body frame 1 by the ignition coil mounting portion 812 (see FIG. 2) provided in the rear down frame member 80 (see FIG. 2).

As described above, the body frame 1 according to the present invention can exhibit the following effects.

(1) The rear down frame member 80 integrally has the gusset 83 reinforcing the joined portions of the pair of left and right main frame members 31 and 31 to the head pipe 2 and the pair of left and right arms 85 and 85 supporting the pair of left and right main frame members 31 and 31. With this, as compared with when the gusset 83 and the pair of left and right arms 85 and 85 are separated from the rear down frame member 80, the number of components can be reduced.

(2) The gusset 83 and the arm 85 are integrally formed as one member in the rear down frame member 80. Therefore, it is unnecessary to join the gusset 83, the arm 85, and the rear down frame member 80 by welding and to inspect a welded state between the members. The body frame 1 can thus be improved in productivity.

(3) The gusset 83 and the arm 85 are integrally formed as one member in the rear down frame member 80. Therefore, the number of welding beads caused at the time of joining the gusset 83, the arm 85, and the rear down frame member 80 by welding can be reduced, and the members are not required to be overlapped for preventing meltdown in a welding bead. With this, the body frame 1 can be reduced in weight.

(4) The head pipe 2 has the head pipe body member 60, the front down frame member 70, and the rear down frame member 80. As compared with when the head pipe 2 is formed of a single member, the insertion hole which can insert the steering shaft therethrough can be easily formed. That is, the head pipe 2 is divided into three members including the upper portion 2A and the intermediate front portion 2Ca, the lower portion 2B, and the intermediate rear portion 2Cb, so that the insertion hole of the steering shaft can be previously formed into a material shape of each member. With this, a processing allowance for forming the insertion hole by machining after joining of the members can be reduced. A processing ability and yield can be improved to reduce a processing cost.

(5) The down frame 5 is divided into the front down frame member 70 molded by forging and the rear down frame member 80 molded by casting. In addition, the head pipe body member 60 and the swing arm bracket 33 are formed by forging, and the main frame member 31 and the lower frame 6 molded by extrusion.

That is, the member configuring an outer peripheral portion of the body frame 1 is molded by forging or extrusion to have higher strength than when it is molded by casting. An outer peripheral side of the body frame 1 can thus withstand high stress. On the other hand, the member configuring the inward side of the body frame 1 is formed by casting to have a high degree of freedom in shape. Stress caused in the body frame 1 by an input at the time of driving the motorcycle becomes high mainly on the outer peripheral side. As described above, the outer peripheral side of the body frame 1 can withstand high stress. The body frame 1 can thus sufficiently withstand a road surface input.

The inward side of the body frame 1, that is, the rear down frame member 80, is complicated to integrally have the gusset 83 and the pair of left and right arms 85 and 85. However, this member is formed by casting to have a high degree of freedom in shape, so that the gusset 83 and the pair of left and right arms 85 and 85 can be integrated.

Therefore, the body frame 1 is divided into the outer peripheral portion of the vehicle body which is required to withstand high stress and the inward side of the vehicle body which is required to have a high degree of freedom in shape, which are respectively formed by the optimum molding methods. Therefore, the body frame 1 can ensure strength, and integrate the components to reduce the number of components. With this, the body frame 1 can be improved in productivity and be reduced in weight.

(6) The front down frame member 70 integrally has the front mounting portion 731 and the radiator mounting portion 732, and the rear down frame member 80 integrally has the radiator mounting portion 811 and the ignition coil mounting portion 812. As compared with when the mounting portions are separated members, the number of welded components can be further reduced.

(7) The front down frame member 70 configuring the lower portion of the down frame 5 is formed by forging, and is curved forward to enlarge the space on the inward side of the body frame 1. The engine mounting space in the body frame 1 can thus be enlarged. With this, a mountability of the engine 22 on the body frame 1 can be improved.

Figure 9:
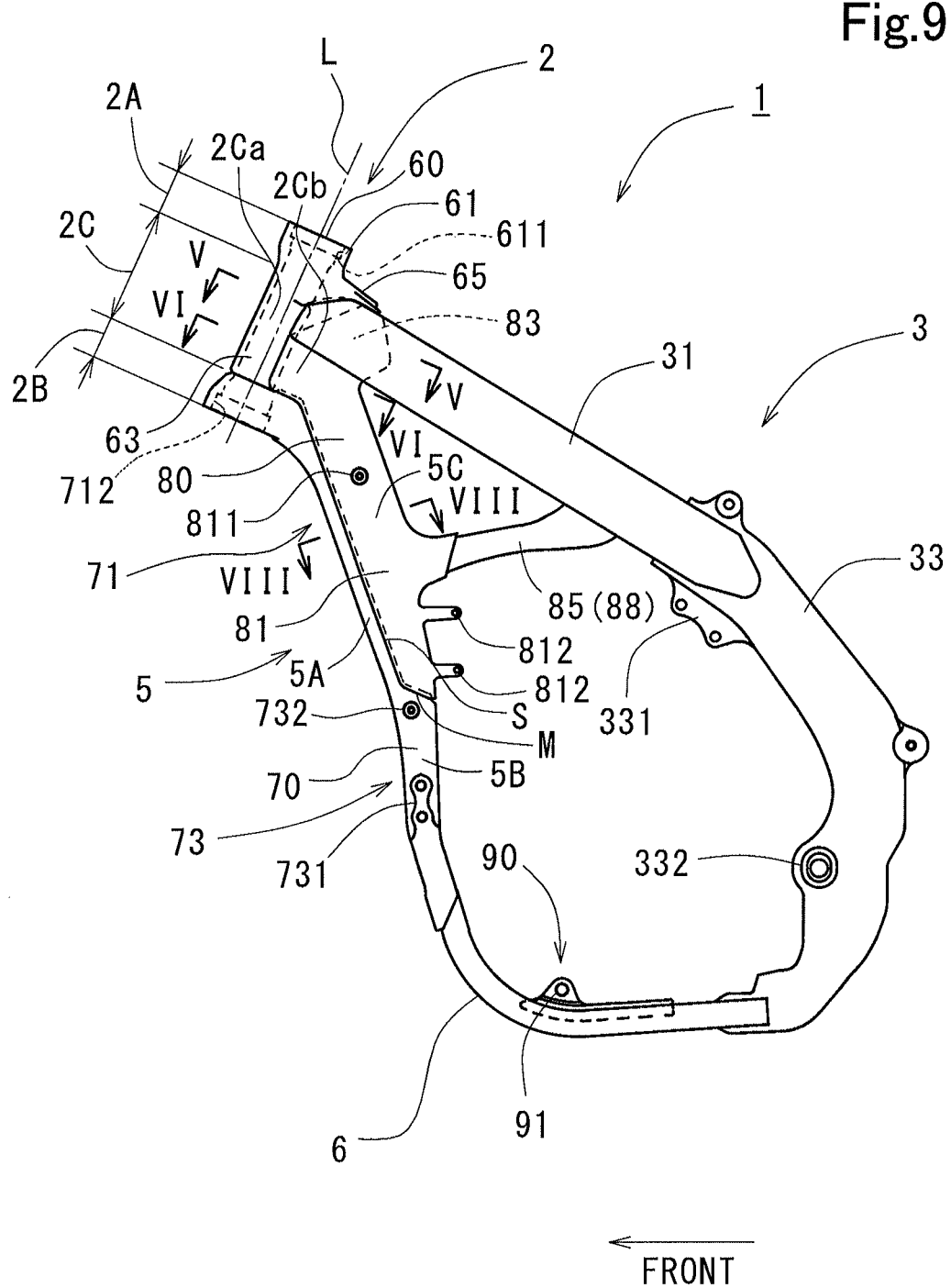
FIG. 9 is a left side view of a body frame according to another embodiment.

On the above embodiment, the rear down frame member 80 integrally has the arms 85 and 85. However, the arms 85 and 85 can be configured as a pair of left and right arm members 88 and 88 separated from the rear down frame member 80. In this case, as shown in FIG. 9, the arm members 88 and 88 can be respectively connected to a rear portion of the rear down frame member 80 at a one of ends of the arm member 88 and a lower portion of the main frame member 31 at the other end at the other of ends by welding.

A pair of the left and right arm member 88 and 88 are separated from the rear down frame member 80. With this, the rear down frame member 80 can be simplified, and thus improved in productivity. Furthermore, for instance, the arm members 88 and 88 can be forged molded articles or extruded pipes made of aluminum alloy. With this, as compared when the arm member 88 is a cast molded article, the arm member 88 can be improved in strength and the body frame 1 thus have higher rigidity.

The present invention is not limited to the motorcycle of the motocrosser type, as described in this embodiment, and is applicable to motorcycles of the American type and the road racing type. In addition, the present invention is not limited to the body frame having the pair of left and right main frames extended rearward from the head pipe and spaced in the left-right direction, as described in this embodiment. The main frames can be extended rearward from the head pipe along a center in the vehicle width direction.

As described above, according to the present invention, the body frame of a motorcycle can ensure strength, and be improved in productivity. The present invention can be preferably used in the manufacture technical field of such a body frame.

What is claimed is:

1. A body frame of a motorcycle comprising:
a head pipe supporting a steering shaft;
a main frame extended rearward of a vehicle body from the head pipe; and
a down frame extended downward of the vehicle body from the head pipe,
wherein the down frame includes a front down frame member forming at least a front portion of the down frame, and a rear down frame member forming at least part of a rear portion of the down frame, which are joined, and
wherein the rear down frame member has an arm supporting the main frame and a gusset reinforcing a joined portion of the main frame to the head pipe, the arm and the gusset being integrally formed with the rear down frame member as a one-piece construction.

2. The body frame according to claim 1,
wherein the head pipe includes a head pipe body member forming an upper portion of the head pipe, and the front down frame member forming a lower portion of the head pipe, which are joined,
wherein the head pipe body member has a first annular portion having a bearing supporting portion supporting an upper bearing pivotally supporting the steering shaft,
wherein the front down frame member has a second annular portion having a bearing supporting portion supporting a lower bearing pivotally supporting the steering shaft, and
wherein a recess opened rearward in a lower portion of the head pipe body member below the first annular portion and a recess opened forward in an upper portion of the rear down frame member are joined to define an insertion hole through which a part of the steering shaft extends.

3. The body frame according to claim 2,
wherein the main frame includes a left main frame member and a right main frame member,
wherein the head pipe body member has an extended portion extended rearward between the left main frame member and the right main frame member,
wherein the gusset has an extended portion joined portion, a left main frame joined portion and a right main frame joined portion,
wherein the extended portion is joined to the extended portion joined portion, and
wherein the left main frame member is joined to the left main frame joined portion and the right main frame member is joined to the right main frame joined portion.

4. The body frame according to claim 1,
wherein the front down frame member is a forged molded article, and
wherein the rear down frame member is a cast molded article.

5. The body frame according to claim 4,
wherein the front down frame member and the rear down frame member integrally have mounting portions for fixing components connected to the body frame.

6. A body frame of a motorcycle comprising:
a head pipe supporting a steering shaft;
a main frame extended rearward of a vehicle body from the head pipe; and
a down frame extended downward of the vehicle body from the head pipe,
wherein the down frame includes a front down frame member forming at least a front portion of the down frame, and a rear down frame member forming at least part of a rear portion of the down frame, which are joined,
wherein the rear down frame member integrally has an arm supporting the main frame and a gusset reinforcing a joined portion of the main frame to the head pipe,
wherein a lower end of the rear down frame member is supported from below by a lower portion of the front down frame member, and
wherein an engine supporting portion supporting an engine is integrally formed in the lower portion of the front down frame member.

7. A body frame of a motorcycle comprising:
a head pipe supporting a steering shaft;
a main frame extended rearward of a vehicle body from the head pipe; and
a down frame extended downward of the vehicle body from the head pipe,
wherein the down frame includes a front down frame member forming at least a front portion of the down frame, and a rear down frame member forming at least part of a rear portion of the down frame, which are joined, and
wherein the rear down frame member has a gusset reinforcing a joined portion of the main frame to the head pipe, the gusset being integrally formed with the rear down frame member as a one-piece construction.

8. The body frame according to claim 7,
wherein the body frame includes an arm member which is connected to the rear down frame member at a first end of the arm member, and which is connected to the main frame at a second end of the arm member, and
wherein the arm member supports the main frame.

9. The body frame according to claim 8,
wherein the arm member is a hollow forged molded article or an extruded pipe.

10. A method for manufacturing a body frame of a motorcycle which has a head pipe supporting a steering shaft, a main frame extended rearward of a vehicle body from the head pipe, and a down frame extended downward of the vehicle body from the head pipe,
wherein the head pipe includes a head pipe body member forming an upper portion of the head pipe, and a front down frame member forming a lower portion of the head pipe, which are joined,
wherein the down frame includes the front down frame member forming at least a front portion of the down frame, and a rear down frame member forming at least part of a rear portion of the down frame, which are joined, and
wherein the rear down frame member has an arm supporting the main frame and a gusset reinforcing a joined portion of the main frame to the head pipe, the arm and the gusset being integrally formed with the rear down frame member as a one-piece construction,
the method comprising:
preparing the head pipe body member as a forged mold article;
preparing the front down frame member as a forged mold article;
preparing the rear down frame member as a cast mold article;
joining the head pipe body member, the front down frame member, and the rear down frame member by welding; and
joining the main frame to the head pipe body member, the gusset, and the arm by welding.

* * * * *